United States Patent
Kawazu et al.

(10) Patent No.: US 6,962,684 B2
(45) Date of Patent: *Nov. 8, 2005

(54) ACTIVATED ALUMINA FORMED BODY AND METHOD FOR PRODUCING THE SAME

(75) Inventors: Hidekatsu Kawazu, Niihama (JP); Osamu Yamanishi, Niihama (JP); Keiichiro Suzuki, Niihama (JP)

(73) Assignee: Sumitomo Chemical Company, Limited, Osaka (JP)

( * ) Notice: Subject to any disclaimer, the term of this patent is extended or adjusted under 35 U.S.C. 154(b) by 288 days.

This patent is subject to a terminal disclaimer.

(21) Appl. No.: 10/154,813

(22) Filed: May 28, 2002

(65) Prior Publication Data

US 2002/0192151 A1 Dec. 19, 2002

(30) Foreign Application Priority Data

May 31, 2001 (JP) ........................................ 2001-164359

(51) Int. Cl.[7] .................................................. C01F 7/00
(52) U.S. Cl. ........................................ 423/628; 502/439
(58) Field of Search ........................... 423/628; 502/439

(56) References Cited

U.S. PATENT DOCUMENTS

| 3,361,682 A | 1/1968 | Keith et al. |
| 3,856,708 A | 12/1974 | Carithers |
| 4,444,899 A | 4/1984 | Yamada et al. |
| 4,555,394 A | 11/1985 | Asaoka et al. |
| 4,608,363 A | 8/1986 | Goodboy |
| 5,935,894 A | 8/1999 | Kanazirev |

FOREIGN PATENT DOCUMENTS

| GB | 1 356 239 | 6/1974 |
| JP | 8-245281 A | 9/1996 |

OTHER PUBLICATIONS

Patent Abstracts of Japan, Japanese Publication No. 08–245281, published Sep. 24, 1996.
Abstract of Japanese Patent Publication No. 02–1767, published Jun., 1990.
Abstract of Japanese Patent Publication No. 49–6006, published Dec. 1974.
Abstract of Japanese Patent Publication No. 63–24932, published Feb. 1988.

*Primary Examiner*—Steven Bos
(74) *Attorney, Agent, or Firm*—Sughrue Mion, PLLC

(57) ABSTRACT

An activated alumina formed body with a high bulk density and a large macro-pore volume is provided. The activated alumina formed body can be produced by a method comprising the steps of calcining a gibbsite-phase aluminum hydroxide having a median particle size of from about 10 $\mu$m to about 35 $\mu$m and a packed bulk density of from about 1.05 g/cm$^3$ to about 1.3 g/cm$^3$ to obtain an at least partially rehydratable alumina powder; forming the rehydratable alumina powder in the presence of water; maintaining the formed body in the presence of water to rehydrate the formed body; and calcining the rehydrated formed body to obtain an activated alumina formed body. The activated alumina formed body is usable as an adsorbent, a catalyst supporting precious metal or the like.

3 Claims, No Drawings

ACTIVATED ALUMINA FORMED BODY AND METHOD FOR PRODUCING THE SAME

BACKGROUND OF THE INVENTION

1. Field of the Invention

The present invention relates to an activated alumina formed body. More specifically, the present invention relates to an activated alumina formed body having a high bulk density and a large macro-pore volume, and a method for producing the activated alumina formed body.

2. Related Art of the Invention

Transition alumina formed bodies, in which alumina has a variety of crystal phases other than α form and is represented by $Al_2O_3$, are used as drying agents, adsorbents, catalysts, various carriers and the like. For these usages, it is preferred that an alumina formed body to be used have a large pore volume in order to increase the diffusion rate of molecules into the alumina formed bodies. Specifically, it is preferred that the alumina formed bodies have a large volume (macro-pore volume) of macro pores having a radius of about 0.1 μm or more, more preferably a radius of about 0.3 μm or more.

On the other hand, when an activated alumina formed body is used in a fixed bed facility as a catalyst carrier, an adsorbent or the like, the activated alumina formed body is preferably packed in a large amount in order to improve catalyst life, the adsorption amount therewith or the like and, therefore, the activated alumina formed body having a high bulk density is desired.

The following techniques are known as methods for producing an activated alumina formed body having a large macro-pore volume.

Method (1): An aluminum salt is neutralized to obtain an alumina gel, while controlling the precipitation condition of alumina, followed by being washed, dried, formed and calcined to obtain an activated alumina formed body (for example, as in Japanese Patent Publication No. 2-1767, which corresponds to U.S. Pat. No. 4,555,394).

Method (2): A rehydratable alumina is mixed with a fibrous flammable organic pore-generating agent, followed by being formed, rehydrated and calcined at a temperature of 450° C. to 650° C., to obtain an activated alumina formed body (for example, as in Japanese Patent Application Laid-Open No. 49-6006, which corresponds to Great Britain Laid-Open Patent Publication No. 1,356,239).

Method (3): An organic pore-generating agent such as Polyethylene glycol, polyvinyl alcohol, crystalline cellulose and carbon black is utilized to obtain an activated alumina formed body. And a polymethacrylic acid ester is utilized as an organic pore-generating agent, which is removed at a low temperature, to obtain an activated alumina formed body (for example, as in Japanese Patent Application Laid-Open No. 8-245281).

However, by any of the methods (1)–(3), the total pore volume increases with increase in macro-pore volume, which results in reduction in bulk density. As a result, it is difficult to obtain an activated alumina formed body having macro-pores with a high bulk density. In addition, by any of the above methods, the resultant activated alumina formed body costs high.

On the other hand, the following method is known as a method for producing an alumina formed body at a low cost.

Method (4): Bayer process is conducted using a gibbsite-phase aluminum hydroxide having a median particle size of about 1 μm to 35 μm and having a quartile deviation of a particle size distribution of about 1.5 or less, to obtain an rehydratable alumina. The rehydratable alumina is formed into a shape of a formed body, followed by being rehydrated and then being calcined, to obtain an activated alumina formed body (for example, as in Japanese Patent Publication No. 63-24932, which corresponds to U.S. Pat. No. 4,444,899). The obtained activated alumina formed body tends to have a large macro-pore volume.

However, method (4) also has problems such that the activated alumina formed body has a large total pore volume, while having a large macro-pore volume. Specifically, as shown in Example 1 of the specification of the above ) publication JP-A-63-24932, the resultant activated alumina body has a packed bulk density of as low as 0.58 kg/l (=g/cm³), since the total pore volume increases. It is difficult in method (4) to provide an activated alumina formed body having macro pores and yet having a high bulk density.

SUMMARY OF THE INVENTION

An object of the present invention is to provide an activated alumina formed body with a high bulk density and a large macro-pore volume as well as to provide a method for producing such an activated alumina formed body at a lower cost than conventional methods.

The inventors of the present invention have made efforts to solve the above-described problems and have found a method for producing an activated alumina formed body having a high bulk density and a large macro-pore volume with lower cost. The present invention has been accomplished based on the findings.

The present invention provides an activated alumina formed body having macro pores with a radius of about 0.3 μm or more, a total volume of the macro pores of about 0.05 cm³/g or more, a packed bulk density of about 0.65 g/cm³ or more, a crashing strength of about 100 daN/cm² or more and a BET specific surface area of about 100 m²/g or more.

Also, the present invention provides a method for producing an activated alumina formed body, the method comprising the steps of:

(i) calcining a gibbsite-phase aluminum hydroxide having a median particle size of from about 10 μm to about 35 μm and a packed bulk density of from about 1.05 g/cm³ to about 1.3 g/cm³ to obtain an at least partially rehydratable alumina powder;

(ii) forming the at least partially rehydratable alumina powder in the presence of water to obtain a formed body;

(iii) maintaining the formed body in the presence of water so as to rehydrate the formed body to obtain a rehydrated formed body; and (iv) calcining the rehydrated formed body to obtain an activated alumina formed body.

By the method described above, an activated alumina formed body with a high bulk density and a high macro-pore volume can be produced at a lower cost than ever before. Moreover, the obtained activated alumina formed body may be excellent in mechanical strength.

DESCRIPTION OF THE INVENTION

In the present invention, an aluminum hydroxide with a gibbsite phase may be used as the raw material. The aluminum hydroxide may be prepared industrially by Bayer process.

The aluminum hydroxide with a gibbsite phase may be an aluminum trihydroxide. The purity of the gibbsite-phase aluminum hydroxide is not limited. The $Na_2O$ content of the aluminum hydroxide may be in the range of from about 0.2% to about 1%.

The aluminum hydroxide to be used in the present invention may have a median particle size of from about 10 μm to about 35 μm.

When the median particle size of the aluminum hydroxide is less than about 10 μm, macro pores tend to be made insufficiently. As a result, it is difficult to obtain a final product, i.e., an activated alumina formed body, having macro pores with a radius of about 0.3 μm or more of which total volume is about 0.05 $cm^3/g$ or more. When the median particle size of the aluminum hydroxide exceeds about 35 μm, abrasion resistance of the activated alumina formed body may decrease, which is not desirable.

The gibbsite-phase aluminum hydroxide to be used in the present invention has a packed bulk density of from about 1.05 $g/cm^3$ to about 1.3 $g/cm^3$.

When the packed bulk density of the aluminum hydroxide is less than about 1.05 $g/cm^3$, the packed bulk density of the resultant activated alumina formed body tends to be less than about 0.65 $g/cm^3$. This may result in reduction in bulk density and may result in failure in attaining the target activated alumina formed body. When the packed bulk density of the aluminum hydroxide exceeds about 1.3 $g/cm^3$, it is difficult to obtain an activated alumina formed body having macro pores. As a result, the finally obtained activated alumina formed body may have a total volume of macro pores, which have a radius of about 0.3 μm or more, of less than about 0.05 ml/g.

In the present invention, the value of the packed bulk density of the aluminum hydroxide with a gibbsite-phase can be measured in the state in which the aluminum hydroxide has the content of water attached thereto of about 1% or less.

In the present invention, the aluminum hydroxide with a gibbsite phase may be calcined to obtain an at least partially rehydratable alumina powder. It is preferred that the aluminum hydroxide is calcined instantaneously. The calcination may be conducted in a known method. The rehydratable alumina refers to one of alumina such as χ-alumina, ρ-alumina and amorphous alumina, which is capable of being rehydrated, among transition alumina obtained by thermal decomposition of aluminum hydroxide.

The preferable instantaneous calcination can be performed by allowing the aluminum hydroxide to flow in an airflow of a linear velocity of from about 5 m/sec to about 50 m/sec at a temperature of from about 500° C. to about 1200° C. for a contact time period of about 0.1 to about 10 seconds. The calcination is preferably continued until the ignition loss becomes from about 3% by weight to about 10% by weight.

The alumina powder obtained after the calcinations in the airflow can be separated from the airflow and can be collected by a known method using a cyclone, a bug filter, an electric collector or the like. The powder may be cooled simultaneously with or after the separation and collection, to obtain the at least partially rehydratable alumina powder.

The thus-obtained at least partially rehydratable alumina powder may have an ignition loss of from about 3% by weight to about 10% by weight and may have a BET specific surface area of about 100 $m^2/g$ or more. The alumina powder may contain χ-alumina and/or ρ-alumina as its main component as to crystal phase.

In the present invention, the at least partially rehydratable alumina powder may be formed in the presence of water to obtain a formed body thereof. The forming may be conducted in a known method. For example, the forming may be conducted by a method in which the rehydratable alumina powder is fed to Marumerizer or a tumbling granulator together with water and is granulated. Alternatively, the forming may be conducted by a method in which the rehydratable alumina powder is moistened with water and then is compacted with a die; a method in which the rehydratable alumina powder is mixed with water and then is formed with an extruder; a method in which the rehydratable alumina powder is mixed with water and then is stirred (and formed) in a solvent that is non-miscible with water. In the forming, a small amount of water-miscible organic solvent can be present with water. If a spherical product is desired, the tumbling granulation method is most suitable because this method provides high productivity.

The amount of water to be present with the rehydratable alumina powder in the forming step is not limited, and may be about 40 parts by weight to about 60 parts by weight based on 100 parts by weight of the rehydratable alumina powder to be formed.

The resultant formed body of the rehydratable alumina powder may have various shapes such as a spherical shape, a cylindrical shape, a ring shape, a plate shape, a honeycomb shape and a block shape.

When the rehydratable alumina powder is formed, another inorganic compound may be added to the rehydratable alumina powder as long as the pore structure and strength of the final product, i.e., an activate alumina formed body will not be impaired. Examples of such an inorganic compound include non-rehydratable alumina such as α-alumina, aluminum salt, silica, clay, talc, bentonite, zeolite, cordierite, titania, alkali metal salt, alkali-earth metal salt, rare earth metal salt, zirconia, mullite and silica alumina. If the salt other than an oxide is added, it is preferred that the salt is decomposed during the calcination conducted later, so as to become an oxide of the salt.

The thus-obtained formed body of the at least partially rehydratable alumina may be maintained in the presence of water (for example, in a humid atmosphere, in a water vapor atmosphere, in a gas containing water vapor or the like) at a temperature of form about 20° C. to about 200° C., and preferably at a temperature of form about 110° C. to about 200° C., so as to rehydrate the formed body. By this rehydration, the mechanical strength of the final product, i.e., an activated formed body, can be enhanced. For the rehydration, it is preferred that the formed body is maintained in a humidity such that water can be adsorbed into the micro-pores of the formed body. The humidity may be about 20% RH or more.

The rehydration of the formed body may be performed for about 1 minute to one week. The longer the rehydration time period is and/or the higher the rehydration temperature is, the higher mechanical strength of the resultant activated alumina formed body has. On the other hand, when the rehydration temperature is higher than about 200° C., the final product tends to have smaller surface area, which is not desirable. Since the rehydratable alumina generates heat during rehydration, the rehydtation temperature can be maintained by preventing dissipation of the heat, without providing outer heating. For example, once the rehydtation starts, the temperature of the formed body may rise to a predetermined temperature in a sealed container placed at a room temperature, and thus the rehydtation may be continued without providing heat.

When the rehydration is conducted at a temperature of about 110° C. or more and the pseudo-boehmite phase (Bo)

is generated as a rehydrate at a rate of about 10% or more, then a large amount of macro pores tends to be observed, which is desirable.

After the rehydration, the alumina rehydrated formed body may be calcined. By this calcination, the water attached to the formed body and crystallization water may be removed, so that an activated alumina formed body is obtained. The calcinaiton may be carried out at a temperature of from about 300° C. to about 1000° C. The calcination temperature may be appropriately decided depending on the target crystal phase, pore diameter or surface area of the intended activated alumina formed body. The calcination can be performed by a known means such as heating with burning gas, indirect heating with an electric heater and infrared heating or the like. Before the calcination, the water attached to the rehydrated formed body is preferably removed by air drying, hot-blast drying, vacuum drying or the like.

When an activated alumina formed body having a large BET specific surface area is desired, the actual temperature of the formed body during the calcination is preferably maintained at a temperature of from about 300° C. to about 500° C.

When the calcination is performed with a movable bed, the moving direction of the rehydrated formed body may be in parallel with or perpendicular to the direction of a hot blast. The hot blast may be generated by any methods such as a method of heating the air with an electric heater or fuel combustion, a method of applying burning gas directly, and the like. In the calcination with a hot blast, the temperature of the hot blast is preferably in the range of from about 300° C. to about 500° C.

When the hot blast temperature is too high, the BET specific surface area of the resultant activated alumina formed body tends to be small. When the hot blast temperature is too low, the removal of crystallization water is insufficient, and then again, it is difficult to obtain an activated alumina formed body having a large BET specific surface area.

More preferably, the hot blast temperature is in the range of from about 300° C. to about 450° C. When the calcination is performed with a movable bed, the linear velocity of the hot blast is preferably in the range of from about 0.05 m/sec to about one (1) m/sec in terms of that under the standard conditions.

When the linear velocity is too low, the actual temperature of the formed body becomes excessively high and thus the BET specific surface area of the resultant activated alumina formed body tends to be small. When the linear velocity is too high, the pressure loss of the hot blast passing through the packed layer may be large, and thus a large hot blast exhauster may be required. This may be undesirable from the standpoint of equipment.

It is preferred to put the rehydrated formed body, the dried rehydrated formed body or the activated alumina formed body obtained after the calcination into contact with an aqueous solution containing an acidic component. If needed, the activated alumina formed body obtained after such a contact with the acidic component may further be calcined. By this treatment with acidic solution, impurities such as $Na_2O$ in the activated alumina formed body can be removed. In addition, there are effects such that the formed body has an acidic surface.

For improvement of the heat resistance, salt of lanthanoide series such as La, salt of alkali-earth metals such as Ba, or a Si compound may be added to the formed body during the rehydration step or the drying step, or to the activated alumina formed body obtained after the calcination, as long as the pore structure and strength of the activate alumina formed body will not be impaired.

The activated alumina formed body obtained in the present invention may have the following physical properties: a BET specific surface area of from about 100 $m^2/g$ to about 400 $m^2/g$, a packed bulk density of about 0.65 $g/cm^3$ or more, a total volume of macro-pores (with a radius of about 0.3 $\mu m$ or more) of about 0.05 $cm^3/g$ or more, a crashing strength of about 100 $daN/cm^2$ or more, and the abrasion rate (measured in accordance with JIS-K1464) of about 2% or less.

The activated alumina obtained in the present invention is usable as an adsorbent as it is, or usable as a catalyst supporting precious metal or the like. The activated alumina may further be calcined at a higher temperature to obtain an α-alumina formed body.

The invention being thus described, it will be apparent that the same may be varied in many ways. Such variations are to be regarded as within the spirit and scope of the invention, and all such phases as would be apparent to one skilled in the art are intended to be within the scope of the following claims.

The entire disclosure of the Japanese Patent Application No. 2001-164359 filed on May 31, 2001, indicating specification, claims and summary, are incorporated herein by reference in their entirety

EXAMPLES

The present invention is described in more detail by following Examples, which should not be construed as a limitation upon the scope of the present invention.

In Examples and Comparative Examples, physical properties of aluminum hydroxides and activated alumina formed bodies were measured as follows:

Median Particle Size:

A median particle size was measured with a Microtrac particle size analyzer manufactured by Leeds & Northrup Co., Ltd.

Packed Bulk Density of Powder:

A packed bulk density of a sample powder was measured with a powder tester manufactured by Hosokawa Powder Technology Foundation.

Pseudo-boehmite Rate:

A pseudo-boehmite rate was calculated from a calibration curve which had been prepared in advance based on the area of the peak of 2θ=14.40°, using a powder X-ray diffractometer manufactured by Rigaku Corporation.

Packed Bulk Density of Formed Body:

A sample formed body was put in a graduated cylinder and was tapped 100 times in accordance with JIS-H1902, to obtain a volume of the sample. Base on the volume, a packing dencity of the sample was calculated.

Total Volume of Macro Pores:

Total volume of macro pores having a radius of 0.3 $\mu m$ or more was measured in a Hg injection method.

Crashing Strength:

A diameter and disruptive strength of a sample grain were measured with a micrometer and a hardness tester, respectively. Based on the diameter and disruptive strength, disruptive strength per cross-section of the sample was calculated. Using 10 samples, an average disruptive strength per cross-section of the samples was obtained, and was utilized as crashing strength of the samples.

BET Specific Surface Area:

BET specific surface area was measured with a specific surface are measuring apparatus manufactured by Mountech Co., Ltd.

Example 1

Dried gibbsite-phase aluminum hydroxide powder (water content: 1% or less) having a median particle size of 11.3 μm and a packed bulk density of 1.12 g/cm$^3$, which had been obtained by Bayer process, was put in a hot gas flow of about 700° C. and was instantaneously calcined, to obtain an alumina powder. The obtained alumina powder was a rehydratable alumina having χ,ρ phase and an ignition loss of 7%.

Using a dish-shaped granulator having a diameter of 1 m, the rehydratable alumina powder was formed into spherical grains having a diameter of from 2 mm to 4 mm, while spraying about 50 parts of water based on 100 parts of the powder. About 1 kg of the grains were put in a glass beaker, which was then placed in a 5-liter autoclave made of stainless steel. While adding water in the autoclave and raising a temperature therein to 110° C., the grains were maintained in a saturated water vapor atmosphere for four hours, so as to rehydrate the grains and allow the grains to be aged. The crystal phase of the resultant aged product was examined, and was found that the product had a pseudo-boehmite rate of 7%.

About 200 g of the aged product was put in an alumina crucible, which was then placed in an electric oven. The temperature in the oven was raised to 400° C. and was maintained for two hours at 400° C. The physical properties of the thus-obtained activated alumina formed body are shown in Table 1.

Example 2

An activated alumina formed body was obtained in the same manner as in Example 1, except that the rehydration temperature was changed from 110° C. to 150° C. The physical properties of the resultant activated alumina formed body are shown in Table 1.

Example 3

An activated alumina formed body was obtained in the same manner as in Example 1 using dried gibbsite-phase aluminum hydroxide powder (water content: 1% or less) having a median particle size of 13.4 μm and a packed bulk density of 1.14 g/cm$^3$, which had been obtained by Bayer process. The physical properties of the resultant activated alumina formed body are shown in Table 1.

Comparative Example 1

An activated alumina formed body was obtained in the same manner as in Example 1 using dried gibbsite-phase aluminum hydroxide powder (water content: 1% or less) having a median particle size of 11.9 μm and a packed bulk density of 0.94 g/cm$^3$, which had been obtained by Bayer process. The physical properties of the resultant activated alumina formed body are shown in Table 1.

Comparative Example 2

An activated alumina formed body was obtained in the same manner as in Example 1, using dried gibbsite-phase aluminum hydroxide powder (water content: 1% or less) having a median particle size of 13 μm and a packed bulk density of 1.4 g/cm$^3$, which had been obtained by Bayer process. The physical properties of the resultant activated alumina formed body are shown in Table 1.

Comparative Example 3

An activated alumina formed body was obtained in the same manner as in Example 1, using dried gibbsite-phase aluminum hydroxide powder (water content: 1% or less) having a median particle size of 8.1 μm and a packed bulk density of 1.15 g/cm$^3$, which had been obtained by Bayer process. The physical properties of the resultant activated alumina formed body are shown in Table 1.

TABLE 1

| | Packed bulk density (g/cm$^3$) | Total volume of macro pores (cm$^3$/g) | Crashing strength (daN/cm$^2$) | BET specific surface area (m$^2$/g) |
|---|---|---|---|---|
| Example 1 | 0.68 | 0.05 | 104 | 319 |
| Example 2 | 0.67 | 0.12 | 107 | 106 |
| Example 3 | 0.67 | 0.11 | 104 | 328 |
| Comparative Example 1 | 0.63 | 0.17 | 64 | 313 |
| Comparative Example 2 | 0.78 | 0.02 | 238 | 146 |
| Comparative Example 3 | 0.70 | 0.01 | 182 | 300 |

What is claimed is:

1. A method for producing an activated alumina formed body, the method comprising the steps of:
   (i) calcining a gibbsite-phase aluminum hydroxide having a median particle size of from about 10 μm to about 35 μm and a packed bulk density of from about 1.05 g/cm$^3$ to about 1.3 g/cm$^3$ to obtain an at least partially rehydratable alumina powder;
   (ii) forming the at least partially rehydratable alumina powder in the presence of water to obtain a formed body;
   (iii) maintaining the formed body in the presence of water so as to rehydrate the formed body to obtain a rehydrated formed body; and
   (iv) calcining the rehydrated formed body to obtain an activated alumina formed body.

2. The method according to claim 1, wherein the step (iii) is a step of maintaining the formed body in the presence of water at a temperature of about 110° C. or more so as to rehydrate the formed body to obtain an activated formed body having pseudo-boehmite phase.

3. The method according to claim 1, wherein the gibbsite-phase aluminum hydroxide has a median particle size of about 11.3 μm to about 35 μm.

* * * * *